(12) United States Patent
Kull

(10) Patent No.: US 6,951,422 B2
(45) Date of Patent: *Oct. 4, 2005

(54) LOW POWER SPINDLE MOTOR WITH A STEPPED SHAFT

(75) Inventor: Andreas Kull, Donaueschingen (DE)

(73) Assignee: Minebea Co., Ltd. (JP)

( * ) Notice: Subject to any disclaimer, the term of this patent is extended or adjusted under 35 U.S.C. 154(b) by 42 days.

This patent is subject to a terminal disclaimer.

(21) Appl. No.: 10/385,821

(22) Filed: Mar. 11, 2003

(65) Prior Publication Data

US 2003/0174913 A1 Sep. 18, 2003

Related U.S. Application Data

(60) Provisional application No. 60/363,937, filed on Mar. 12, 2002.

(30) Foreign Application Priority Data

Aug. 22, 2002 (DE) .......................................... 102 38 558

(51) Int. Cl.[7] ............................................. F16C 32/06
(52) U.S. Cl. ..................................................... 384/107
(58) Field of Search ............................ 310/90; 384/100, 384/107, 112, 113, 110, 121, 123, 124; 360/98.07, 99.08, 99.04

(56) References Cited

U.S. PATENT DOCUMENTS

| | | | |
|---|---|---|---|
| 4,043,612 A | * | 8/1977 | Orcutt ........................ 384/110 |
| 4,892,418 A | * | 1/1990 | Asada et al. ................ 384/124 |
| 5,427,456 A | | 6/1995 | Hensel |
| 5,433,529 A | | 7/1995 | Hensel |
| 5,516,212 A | * | 5/1996 | Titcomb ...................... 384/107 |
| 5,524,986 A | * | 6/1996 | Leuthold et al. ............ 384/119 |
| 5,536,088 A | | 7/1996 | Cheever et al. |
| 5,575,355 A | * | 11/1996 | Williams et al. ........... 184/55.1 |
| 5,598,048 A | * | 1/1997 | Dunfield et al. ......... 360/98.07 |
| 5,658,080 A | | 8/1997 | Ichiyama |
| 5,810,480 A | | 9/1998 | Asada et al. |
| 5,847,479 A | | 12/1998 | Wang et al. |
| 6,130,802 A | | 10/2000 | Rahman et al. |
| 6,137,650 A | | 10/2000 | Heine et al. |
| 6,144,523 A | | 11/2000 | Murthy et al. |
| 6,154,339 A | | 11/2000 | Grantz et al. |
| 6,219,199 B1 | | 4/2001 | Sakuragi et al. |
| 6,292,328 B1 | | 9/2001 | Rahman et al. |
| 6,357,916 B2 | | 3/2002 | Saeki et al. |
| 6,361,214 B1 | | 3/2002 | Ichiyama |
| 6,733,180 B2 | * | 5/2004 | Nakamura ................... 384/100 |

* cited by examiner

*Primary Examiner*—Thomas R. Hannon
(74) *Attorney, Agent, or Firm*—Schulte Roth & Zabel, LLP; Joel E. Lutzker; Anna Vishev

(57) ABSTRACT

A spindle motor for use in a disk drive, the spindle motor including a shaft having a larger diameter section and a smaller diameter section with a step formed therebetween. The spindle motor also includes a bearing sleeve having a central cylindrical opening, the shaft is inserted into the central cylindrical opening. A bearing gap is formed between the shaft and the bearing sleeve, the bearing gap being filled with lubricating fluid. A thrust plate is fixedly mounted on the shaft in the area of the step such that an upper side of the thrust plate is placed adjacently to the larger diameter section and a lower side of the thrust plate is placed adjacently to the smaller diameter section of the shaft.

26 Claims, 3 Drawing Sheets

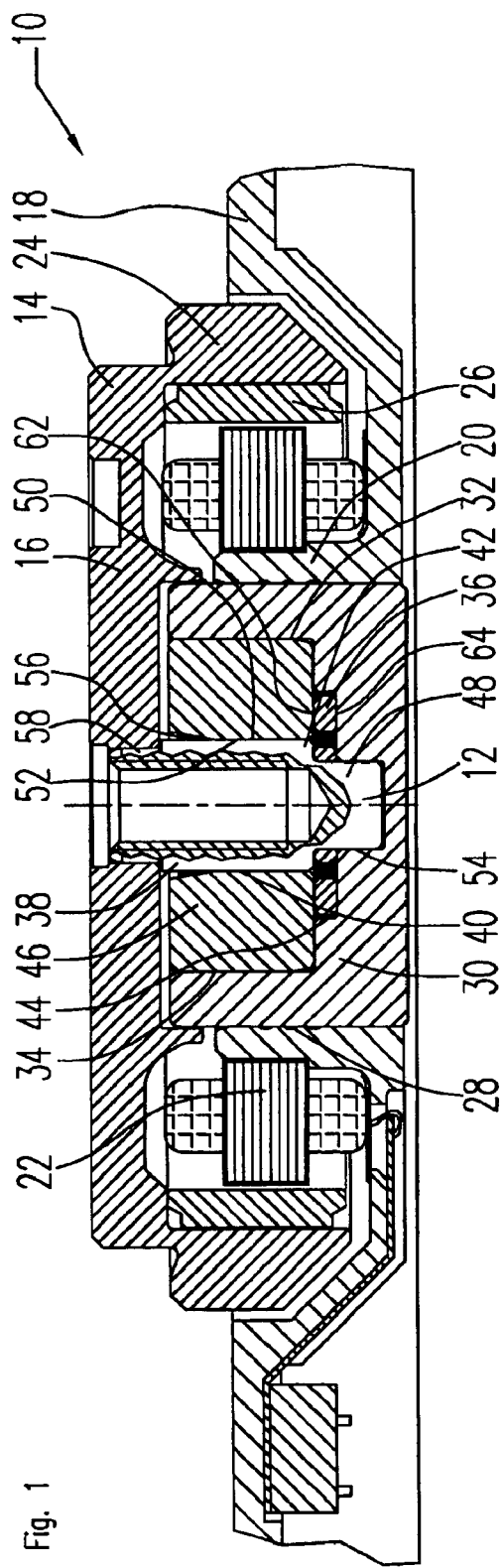
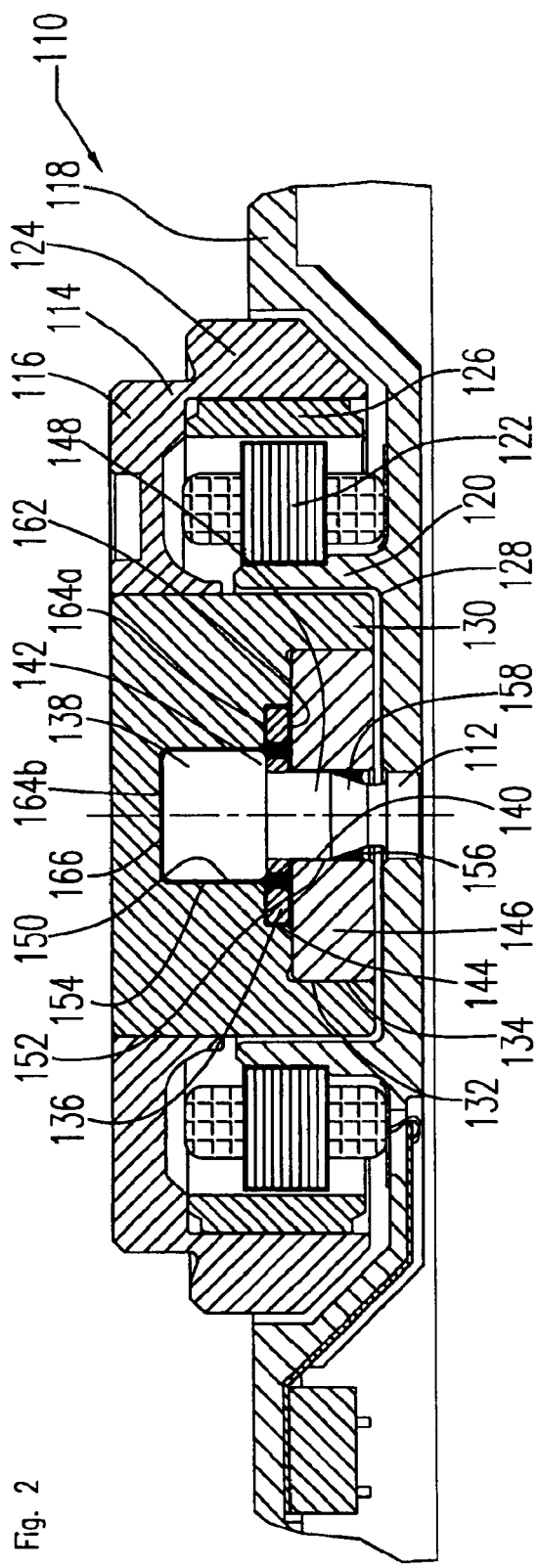
Fig. 1
Fig. 2

LOW POWER SPINDLE MOTOR WITH A STEPPED SHAFT

RELATED APPLICATIONS

This application claims all rights of priority to U.S. Provisional Patent Application No. 60/363,937 filed on Mar. 12, 2002 (pending) and to German Patent Application No. 102 38 558.0 filed on Aug. 22, 2002 (pending).

FIELD OF THE INVENTION

The following invention relates to brushless direct current spindle motors of the type used in disk drives and in particular relates to improvements in hydrodynamic bearings for such motors.

BACKGROUND OF THE INVENTION

Disc drive systems have been used in computers and other electronic devices for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm which moves radially over the surface of the disc. The read/write heads or transducers must be accurately aligned with the storage tracks on the disc to ensure proper reading and writing of information; thus the discs must be rotationally stable.

Electric spindle motors of the type used in disk drives conventionally rely on ball bearings to support a rotary member, such as a rotating hub, on a stationary member, such as a shaft. Ball bearings are known to wear parts, and in time increased friction will cause failure of the motor. In addition, ball bearings create debris in the form of dust or fine particles that can find their way into "clean" chambers housing the rotary magnetic disks which are driven by the motor. The mechanical friction inherent in ball bearings also generates heat, noise and vibration, all of which are undesirable in a disk drive motor.

Fluid bearings represent a considerable improvement over conventional ball bearings in spindle drive motors. In these types of systems, lubricating fluid, either gas or liquid, functions as the actual bearing surface between a stationary base or housing in the rotating spindle or rotating hub of the motor. Liquid lubricants, for example, oil, complex ferromagnetic fluids or even air, have been utilized in hydrodynamic bearing systems. As compared with ball bearings, fluid dynamic bearings have improved running accuracy, greater impact strength and lower noise generation.

One example of a spindle motor utilizing a prior art fluid dynamic bearing is disclosed in U.S. Pat. No. 5,658,080. The '080 patent shows a spindle motor including a shaft retained in a shaft retainer and a thrust plate provided to the shaft. A thrust dynamic pressure fluid bearing is provided between the thrust plate and the shaft retainer. A radial dynamic pressure fluid bearing is provided between the shaft retainer and the shaft. A ring-shaped space formed between the outer circumferential surface of the thrust plate and the inner circumferential surface of the shaft retainer is partially filled with oil. Ring-shaped projections are provided on the outer circumferential surface of the thrust plate. When the motor is running at a high-speed, oil in the ring-shaped space is retained on the shaft retainer and through this oil, oil in the thrust dynamic pressure fluid bearings at the upper and lower surface sides are communicated with each other.

SUMMARY OF THE INVENTION

It is an object of the present invention to provide a spindle motor with a stepped shaft which saves run-current and, therefore, reduces power consumption of the spindle motor.

Present invention provides a spindle motor for use in a disk drive, the spindle motor including a shaft having a larger diameter section and a smaller diameter section with a step formed therebetween. The spindle motor also includes a bearing sleeve having a central cylindrical opening, the shaft is inserted into the central cylindrical opening. A bearing gap is formed between the shaft and the bearing sleeve, the bearing gap being filled with lubricating fluid. A thrust plate is fixedly mounted on the shaft in the area of the step such that an upper side of the thrust plate is placed adjacently to the larger diameter section and a lower side of the thrust plate is placed adjacently to the smaller diameter section of the shaft.

The above and other objects, aspects, features and advantages of the invention will be more readily apparent from the description of the preferred embodiments thereof taken in conjunction with the accompanying drawings.

BRIEF DESCRIPTION OF THE DRAWINGS

The invention is illustrated by way of example and not limitation and the figures of the accompanying drawings in which like references denote like or corresponding parts, and in which:

FIG. 1 is a side cut-away view of an electronic spindle motor having a rotational stepped shaft with a thrust-washer mounted on the shaft in the area of the step.

FIG. 2 is a side cut-away view of an electronic spindle motor having a fixed shaft with a thrust-washer mounted on the shaft in the area of the step.

DETAILED DESCRIPTION OF THE PREFERRED EMBODIMENTS AND THE DRAWINGS

Figure 3:
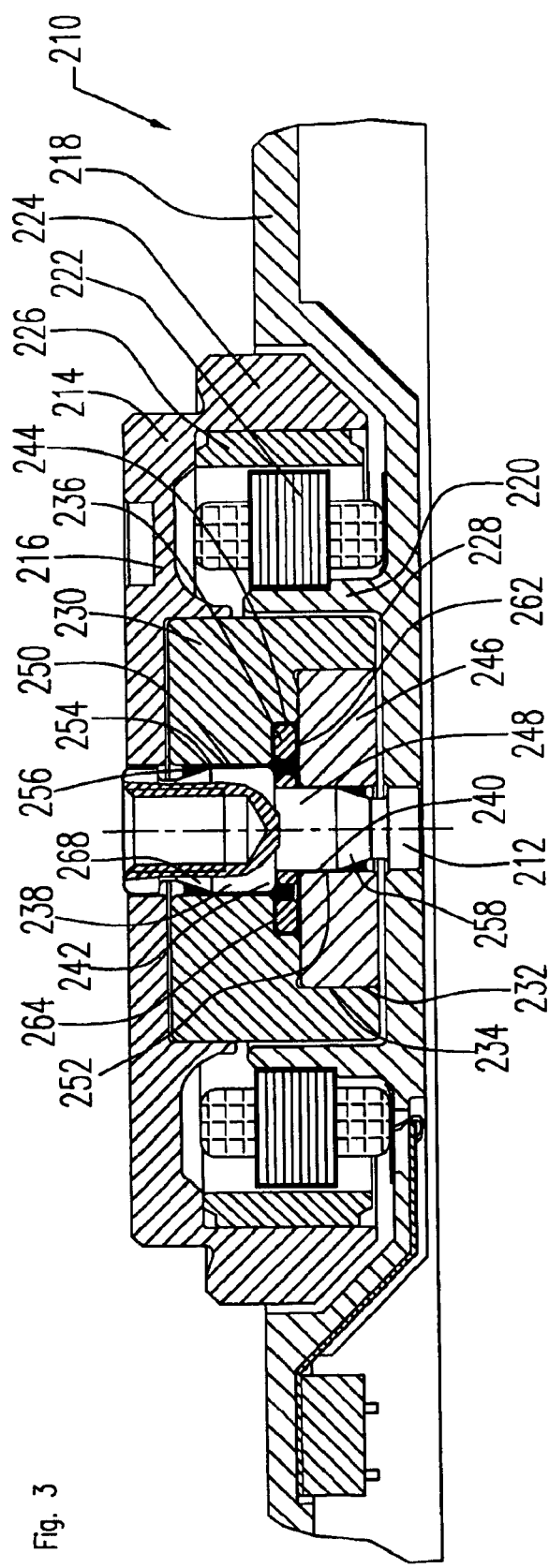
FIG. 3 is a side cut-away view of an electronic spindle motor having a fixed stepped shaft with a thrust-washer, the shaft is capable of being attached to a top housing cover (not shown) of the disk drive.

As shown in FIG. 1, a compact electronic spindle motor 10 preferably includes a central rotatable shaft 12 supporting for rotation a rotor 14 having a hub 16. When the motor 10 is used in a disc drive, the hub 16 will support and carry a magnetic disc (not shown) during rotation. The rotor 14 comprises an annular vertical rotor support wall 24, which supports rotor magnets 26. A stator 18 preferably includes an annular vertical stator support wall 20, which supports a plurality of stator windings 22 such that the stator windings are located in opposing relationship with rotor magnets 26. The stator support wall 20 defines an inner cylindrical hole 28. A bearing sleeve 30 is inserted into the inner cylindrical hole 28 and is fixedly mounted therein. The bearing sleeve 30 may be glued to the inner wall of the hole 28.

In the preferred embodiment, the shaft 12 preferably has a first cylindrical portion 38 having an outer diameter D1, a second cylindrical portion 48 having an outer diameter D2 and a third cylindrical portion 58 having an outer diameter D3. The outer diameter D1 of the first cylindrical portion 38 is greater than the outer diameter D2 of the second cylindrical portion 48. A step 42 is formed between the first and the second cylindrical portions of the shaft. The hub 16 is mounted for rotation on the third cylindrical portion 58 of the shaft 12. The outer diameter D3 of the third cylindrical portion may be different from the outer diameter D1 of the first cylindrical portion. A thrust-washer 36 is fixedly mounted on the second cylindrical portion 48 of the shaft 12 adjacently to the step 42. The thrust-washer 36 has an outer diameter D4.

In the preferred embodiment, the bearing sleeve 30 has an inner void 32 with substantially cylindrical walls and at least three chambers of various inner diameters. A first sleeve chamber 34 has an inner diameter d1, a second sleeve chamber 44 has an inner diameter d2 and a third sleeve chamber 54 has an inner diameter d3. The inner diameter d3 of the third sleeve chamber 54 is slightly greater than the outer diameter D2 of the second cylindrical shaft portion 48. The inner diameter d2 of the second sleeve chamber 44 is slightly greater than the outer diameter D4 of the thrust-washer 36.

The central shaft 12 is preferably inserted into the inner void 32 such that the second cylindrical shaft portion 48 is located within the third sleeve chamber 54 and the thrust-washer 36 is located within the second sleeve chamber 44. The shaft 12 is secured from falling out from the void 32 by a counter-plate 46, which is placed into the first sleeve chamber 34. The counter-plate 46 is fixed with respect to the bearing sleeve 30. The counter-plate 46 has a central cylindrical bore 52 having an inner diameter d4. The inner diameter d4 of the bore 52 is slightly greater than the outer diameter D1 of the first cylindrical shaft portion 38 and is smaller than the outer diameter D4 of the thrust-washer 36. Thus, the portion of the counter-plate 46 adjacent to the thrust-washer 36 secures the thrust-washer within the second sleeve chamber 44 and prevents the shaft 12 from falling out of the void 32.

As mentioned above, the inner diameter d4 of the bore 52 is slightly greater than the outer diameter D1 of the first cylindrical shaft portion 38. Therefore, a gap 40 is formed between an outer surface of the shaft 12 and an inner surface of the bore 52. The gap 40 is filled with an appropriate lubricating fluid. The bore 52 preferably has a tapered portion 56 the tapering slope of which is preferably calculated such that there is an adequate surface tension between lubricating fluid within the bearing and the walls of the bore 52 and the shaft 12. During rotation, the lubricating fluid is kept inside the bearing structure by a capillary seal formed by the fluid within the tapered portion 56. The tapered portion 56 also provides a reservoir for the lubricating fluid.

Figure 4:
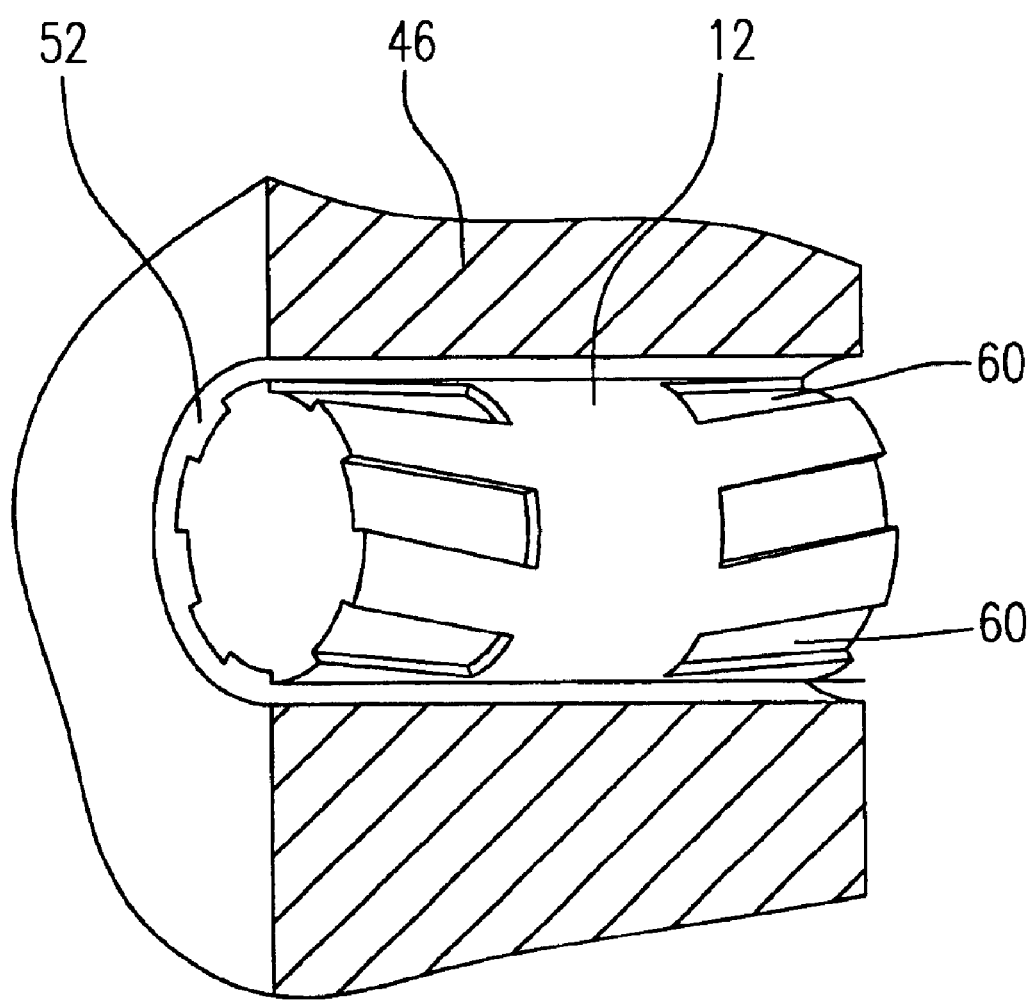
FIG. 4 is a perspective view of a shaft inserted into a bearing sleeve and having a plurality of herringbone grooves.

At least one radial bearing 50 is provided between opposing side walls of the first cylindrical shaft portion 38 and the bore 52. In the preferred embodiment, radial hydrodynamic bearings 50 are provided in the area of the first cylindrical shaft portion 38 and the second cylindrical shaft portion 48. Dynamic pressure generating grooves 60 may be formed on either the outer surface of the shaft 12, as shown in FIG. 4, or the inner surface of the bore 52. A top thrust bearing 62 is provided between opposing sides of the counter-plate 46 and the thrust-washer 36 by forming herringbone or spiral grooves on either of these opposing sides. A bottom thrust-bearing 64 is preferably provided between opposing sides of the thrust-washer 36 and the second sleeve chamber 44 by forming herringbone or spiral grooves on either of these opposing sides. Thus, as shown in FIG. 1, at least one thrust bearing is formed on the lower side of the thrust-washer adjacent to the smaller diameter portion of the shaft 12. The two thrust bearings in combination with the stepped shaft provide an adequate support for the shaft 12 in the axial direction and a proper alignment of the thrust-washer.

In a typical spindle motor utilizing hydrodynamic thrust bearings, such bearings have to have very high stiffness characteristics. In contrast with currently available designs, the described embodiment of the present invention, where at least one thrust bearing is located on the side of the thrust-washer adjacent to the smaller diameter portion of the shaft, results in a good motor performance wherein only the top thrust bearing 62 is characterized by high stiffness. The lower thrust bearing 64, however, has a low stiffness. The reduced stiffness of the lower thrust bearing results in a lower power consumption of the provided spindle motor.

A second embodiment of the spindle motor is shown in FIG. 2. In accordance with the second embodiment, a compact electronic spindle motor 110 preferably includes a rotatable sleeve 130 supporting for rotation a rotor 114 having a hub 116. The bearing sleeve 130 may be glued to the hub 116. When the motor 110 is used in a disc drive, the hub 116 will support and carry a magnetic disc (not shown) during rotation. The rotor 114 comprises an annular vertical rotor support wall 124, which supports rotor magnets 126. A stator 118 preferably includes an annular vertical stator support wall 120, which supports a plurality of stator windings 122 such that the stator windings are located in opposing relationship with rotor magnets 126. The stator support wall 120 defines an inner cylindrical cup-shaped opening 128. A central fixed stepped shaft 112 is inserted into the bottom wall of the cylindrical cup-shaped opening 128 and is fixedly mounted therein.

In the second preferred embodiment, the shaft 112 preferably has a first cylindrical portion 138 having an outer diameter D11, a second cylindrical portion 148 having an outer diameter D12 and a conical portion 158 having an outer diameter varying from D12 (along the connection with the second cylindrical portion 148) to D13 (along the connection with the bottom wall of the cup-shaped opening 128). The outer diameter D11 of the first cylindrical portion 138 is greater than the outer diameter D12 of the second cylindrical portion 148. A step 142 is formed between the first and the second cylindrical portions of the shaft. The outer diameter D13 of the conical portion 158 is preferably smaller than the outer diameter D12 of the same shaft portion. A thrust-washer 136 is fixedly mounted on the second cylindrical portion 148 of the shaft 112 adjacently to the step 142. The thrust-washer 136 has an outer diameter D14.

In the second preferred embodiment, the bearing sleeve 130 has an inner void 132 with substantially cylindrical walls and at least three chambers of various inner diameters. A first sleeve chamber 134 has an inner diameter d11, a second sleeve chamber 144 has an inner diameter d12 and a third sleeve chamber 154 has an inner diameter d13. The inner diameter d13 of the third sleeve chamber 154 is slightly greater than the outer diameter D11 of the first cylindrical shaft portion 138. The inner diameter d12 of the second sleeve chamber 144 is slightly greater than the outer diameter D14 of the thrust-washer 136.

The central shaft 112 is preferably inserted into the inner void 132 such that the first cylindrical shaft portion 138 is located within the third sleeve chamber 154 and the thrust-washer 136 is located within the second sleeve chamber 144. The shaft 112 is secured from falling out from the void 132 by a counter-plate 146, which is placed into the first sleeve chamber 134. The counter-plate 146 is fixed with respect to the bearing sleeve 130. The counter-plate 146 has a central cylindrical bore 152 having an inner diameter d14. The inner diameter d14 of the bore 152 is slightly greater than the outer diameter D12 of the second cylindrical shaft portion 148 and the conical shaft portion 158 and is smaller than the outer diameter D14 of the thrust-washer 136. Thus, the portion of the counter-plate 146 adjacent to the thrust-washer 136 secures the thrust-washer within the second sleeve chamber 144 and prevents the shaft 112 from falling out of the void 132.

As mentioned above, the inner diameter d14 of the bore 152 is slightly greater than the outer diameter D12 of the second cylindrical shaft portion 148. Therefore, a gap 140 is formed between an outer surface of the shaft 112 and an inner surface of the bore 152. The gap 140 is filled with an appropriate lubricating fluid. The conical shaft portion 158 forms a tapered portion 156 the tapering slope of which is preferably calculated such that there is an adequate surface tension between lubricating fluid and the walls of the bore 152 and the shaft 112. During rotation, the lubricating fluid is kept inside the bearing structure by a capillary seal formed by the fluid within the tapered portion 156. The tapered portion 156 also provides a reservoir for the lubricating fluid.

At least one radial bearing 150 is provided between opposing side walls of the first cylindrical shaft portion 138 and the third sleeve chamber 154. In the preferred embodiment, radial hydrodynamic bearings 150 are provided in the area of the first cylindrical shaft portion 138 and the second cylindrical shaft portion 148. Dynamic pressure generating herringbone grooves may be formed on either the outer surface of the shaft 112 or the inner surface of the third sleeve chamber 154. A bottom thrust bearing 162 is provided between opposing sides of the counter-plate 146 and the thrust-washer 136 by forming herringbone or spiral grooves on either one of these opposing sides. A top thrust-bearing 164a is preferably provided between opposing sides of the thrust-washer 136 and the second sleeve chamber 144 by forming herringbone or spiral grooves on either one of these opposing sides. Alternatively, the top thrust bearing 164b may be provided between the top side 166 of the shaft 112 and the opposing side of the sleeve chamber 154. Thus, as shown in FIG. 2, at least one thrust bearing is formed on the lower side of the thrust-washer adjacent to the smaller diameter portion of the shaft 112. The two thrust bearings in combination with the stepped shaft provide an adequate support for the shaft 112 in the axial direction and a proper alignment of the thrust-washer.

Similarly to the first embodiment, the described second embodiment of the spindle motor having at least one thrust bearing located on the side of the thrust-washer adjacent to the smaller diameter portion of the shaft, results in a good motor performance wherein only the top thrust bearing 164a or 164b is characterized by high stiffness. The lower thrust bearing 162, however, has a low stiffness. The reduced stiffness of the lower thrust bearing results in a lower power consumption of the provided spindle motor.

A third embodiment of the spindle motor is shown in FIG. 3. In accordance with the third preferred embodiment, a compact electronic spindle motor 210 preferably includes a rotatable sleeve 230 supporting for rotation a rotor 214 having a hub 216. The bearing sleeve 230 may be glued to the hub 216. When the motor 210 is used in a disc drive, the hub 216 will support and carry a magnetic disc (not shown) during rotation. The rotor 214 comprises an annular vertical rotor support wall 224, which supports rotor magnets 226. A stator 218 preferably includes an annular vertical stator support wall 220, which supports a plurality of stator windings 222 such that the stator windings are located in opposing relationship with rotor magnets 226. The stator support wall 220 defines an inner cylindrical cup-shaped opening 228. A central fixed stepped shaft 212 is inserted into the bottom wall of the cylindrical cup-shaped opening 228 and is fixedly mounted therein. The central shaft 212 may be press-fit into the bottom wall of the cup-shaped opening and may be further secured in a top cover (not shown) of the provided disc drive. Although this top-cover attachment of the shaft is not currently utilized with 2.5″ disc drives, it may be utilized with the presently provided motor because of the motor's low power consumption.

In the third preferred embodiment, the shaft 212 preferably has a first cylindrical portion 238 having an outer diameter D21, a second cylindrical portion 248 having an outer diameter D22, a first conical portion 258 having an outer diameter varying from D22 (along the connection with the second cylindrical portion 248) to D13 (along the connection with the bottom wall of the cup-shaped opening 228) and a second conical portion 268 having an outer diameter varying from D21 (along the connection with the first cylindrical portion 238) to D25 (adjacent to the hub 216). The outer diameter D21 of the first cylindrical portion 238 is greater than the outer diameter D22 of the second cylindrical portion 248. A step 242 is formed between the first and the second cylindrical portions of the shaft. The outer diameter D23 of the first conical portion 258 is preferably smaller than the outer diameter D22 of the same shaft portion. The outer diameter D25 of the second conical portion 268 is preferably smaller than the outer diameter D21 of the same shaft portion. A thrust-washer 236 is fixedly mounted on the second cylindrical portion 248 of the shaft 212 adjacently to the step 242. The thrust-washer 236 has an outer diameter D24.

In the third preferred embodiment, the bearing sleeve 230 has an inner void 232 with substantially cylindrical walls and at least three chambers of various inner diameters. A first sleeve chamber 234 has an inner diameter d21, a second sleeve chamber 244 has an inner diameter d22 and a third sleeve chamber 254 has an inner diameter d23. The inner diameter d23 of the third sleeve chamber 254 is slightly greater than the outer diameter D21 of the first cylindrical shaft portion 238. The inner diameter d22 of the second sleeve chamber 244 is slightly greater than the outer diameter D24 of the thrust-washer 236.

The central shaft 212 is preferably inserted into the inner void 232 such that the first cylindrical shaft portion 238 and the second conical shaft portion 268 are located within the third sleeve chamber 254 and the thrust-washer 236 is located within the second sleeve chamber 244. The shaft 212 is secured from falling out from the void 232 by a counter-plate 246, which is placed into the first sleeve chamber 234. The counter-plate 246 is fixed with respect to the bearing sleeve 230. The counter-plate 246 has a central cylindrical bore 252 having an inner diameter d24. The inner diameter d24 of the bore 252 is slightly greater than the outer diameter D22 of the second cylindrical shaft portion 248 and the first conical shaft portion 258 and is smaller than the outer diameter D24 of the thrust-washer 236. Thus, the portion of the counter-plate 246 adjacent to the thrust-washer 236 secures the thrust-washer within the second sleeve chamber 244 and prevents the shaft 212 from falling out of the void 232.

As mentioned above, the inner diameter d24 of the bore 252 is slightly greater than the outer diameter D22 of the second cylindrical shaft portion 248. Similarly, the inner diameter d23 of the third sleeve chamber 254 is slightly greater than the outer diameter D21 of the first cylindrical shaft portion 238. Therefore, a gap 240 is formed between an outer surface of the shaft 212 and inner surfaces of the bore 252 and the sleeve 230. The gap 240 is filled with an appropriate lubricating fluid. The conical shaft portions 258 and 268 form tapered portions 256 at the top of the sleeve 230 and the bottom of the bore 252. The tapering slope of portions 256 is preferably calculated such that there is an adequate surface tension between lubricating fluid and the walls of portions 256. During rotation, the lubricating fluid is kept inside the bearing structure by a capillary seal formed by the fluid within the tapered portion 256. The tapered portion 256 also provides a reservoir for the lubricating fluid.

At least one radial bearing 250 is provided between opposing side walls of the first cylindrical shaft portion 238 and the third sleeve chamber 254. In the preferred embodiment, radial hydrodynamic bearings 250 are provided in the area of the first cylindrical shaft portion 238 and the second cylindrical shaft portion 248. Dynamic pressure generating herringbone grooves may be formed on either the outer surface of the shaft 212 or the inner surface of the third sleeve chamber 254. A bottom thrust bearing 262 is provided between opposing sides of the counter-plate 246 and the thrust-washer 236 by forming herringbone or spiral grooves on either one of these opposing surfaces. A top thrust-bearing 264 is preferably provided between an upper surface of the thrust-washer 236 and the opposing surface of the second sleeve chamber 144 by forming herringbone or spiral grooves on either one of these opposing surfaces. Thus, as shown in FIG. 3, at least one thrust bearing is formed on the lower side of the thrust-washer adjacent to the smaller diameter portion of the shaft 212. The two thrust bearings in combination with the stepped shaft provide an adequate support for the shaft 212 in the axial direction and a proper alignment of the thrust-washer.

Similarly to the first and second embodiments, the described third embodiment of the spindle motor having at least one thrust bearing located on the side of the thrust-washer adjacent to the smaller diameter portion of the shaft, results in a good motor performance wherein only the top thrust bearing 264 is characterized by high stiffness. The lower thrust bearing 262, however, has a low stiffness. The reduced stiffness of the lower thrust bearing results in a lower power consumption of the provided spindle motor.

The disclosed invention is particularly useful if utilized in connection with a 2.5" disc drive. However, the invention may be used with other spindle motors as well.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A spindle motor for use in a disk drive comprising:
   a shaft having a straight larger diameter section and a straight smaller diameter section with a step formed therebetween;
   a bearing sleeve having a central cylindrical opening, said shaft being inserted into said central cylindrical opening;
   a bearing gap formed between said shaft and said bearing sleeve, said bearing gap being filled with lubricating fluid; and
   a thrust plate fixedly mounted on said shaft in the area of said step such that an upper side of said thrust plate is placed adjacently to said larger diameter section and a lower side of said thrust plate is placed adjacently to said smaller diameter section;
   wherein a first radial hydrodynamic bearing is formed within said larger diameter section of the shaft, wherein a second radial hydrodynamic bearing is formed within said smaller diameter section of the shaft, wherein said first radial hydrodynamic bearing is located above said thrust plate and wherein said second radial hydrodynamic bearing is located below said thrust plate.

2. The spindle motor according to claim 1, wherein said first radial hydrodynamic bearing and said second hydrodynamic bearing are formed by dynamic pressure generating grooves placed on either an outer surface of said shaft or an inner surface of said bearing sleeve.

3. The spindle motor according to claim 1, wherein a counter plate is placed into said bearing sleeve to seal said central cylindrical opening such that said counter plate and said thrust plate are located in an opposing relationship.

4. The spindle motor according to claim 3, wherein a thrust hydrodynamic bearing is formed between said thrust plate and said counter plate.

5. The spindle motor according to claim 3, wherein a tapered capillary seal is formed at an open end of said counter plate, said tapered capillary seal sealing said lubricating fluid in said bearing gap.

6. The spindle motor according to claim 1, wherein a sleeve step is formed in said bearing sleeve adjacent said thrust plate.

7. The spindle motor according to claim 6, wherein a hydrodynamic thrust bearing is formed between said thrust plate and said sleeve step.

8. The spindle motor according to claim 1, wherein a tapered capillary seal is formed at an open end of said bearing sleeve, said tapered capillary seal sealing said lubricating fluid in said bearing gap.

9. The spindle motor according to claim 1, wherein one end of said shaft is completely enclosed by said bearing sleeve.

10. The spindle motor according to claim 9, wherein a hydrodynamic thrust bearing is formed between said one end of the shaft and said bearing sleeve.

11. The spindle motor according to claim 1, further comprising a base frame and a housing cover, wherein one end of said shaft is secured to the base frame while another end of said shaft is secured to the housing cover.

12. The spindle motor according to claim 1, wherein said shaft is a rotational component of said spindle motor.

13. The spindle motor according to claim 1, wherein said shaft is a stationary component of said spindle motor.

14. A disk drive having a spindle motor, the spindle motor comprising:
   a shaft having a straight larger diameter section and a straight smaller diameter section with a step formed therebetween;
   a bearing sleeve having a central cylindrical opening, said shaft being inserted into said central cylindrical opening;

a bearing gap formed between said shaft and said bearing sleeve, said bearing gap being filled with lubricating fluid; and a thrust plate fixedly mounted on said shaft in the area of said step such that an upper side of said thrust plate is placed adjacently to said larger diameter section and a lower side of said thrust plate is placed adjacently to said smaller diameter section;

wherein a first radial hydrodynamic bearing is formed within said larger diameter section of the shaft, wherein a second radial hydrodynamic bearing is formed within said smaller diameter section of the shaft, wherein said first radial hydrodynamic bearing is located above said thrust plate and wherein said second radial hydrodynamic bearing is located below said thrust plate.

15. The disk drive according to claim 14, wherein said first radial hydrodynamic bearing and said second hydrodynamic bearing are formed by dynamic pressure generating grooves placed on either an outer surface of said shaft or an inner surface of said bearing sleeve.

16. The disk drive according to claim 14, wherein a counter plate is placed into said bearing sleeve to seal said central cylindrical opening such that said counter plate and said thrust plate are located in an opposing relationship.

17. The disk drive according to claim 16, wherein a thrust hydrodynamic bearing is formed between said thrust plate and said counter plate.

18. The disk drive according to claim 16, wherein a tapered capillary seal is formed at an open end of said counter plate, said tapered capillary seal sealing said lubricating fluid in said bearing gap.

19. The disk drive according to claim 14, wherein a sleeve step is formed in said bearing sleeve adjacent said thrust plate.

20. The disk drive according to claim 19, wherein a hydrodynamic thrust bearing is formed between said thrust plate and said sleeve step.

21. The disk drive according to claim 14, wherein a tapered capillary seal is formed at an open end of said bearing sleeve, said tapered capillary seal sealing said lubricating fluid in said bearing gap.

22. The disk drive according to claim 14, wherein one end of said shaft is completely enclosed by said bearing sleeve.

23. The disk drive according to claim 22, wherein a hydrodynamic thrust bearing is formed between said one end of the shaft and said bearing sleeve.

24. The disk drive according to claim 14, further comprising a base frame and a housing cover, wherein one end of said shaft is secured to the base frame while another end of said shaft is secured to the housing cover.

25. The disk drive according to claim 14, wherein said shaft is a rotational component of said spindle motor.

26. The disk drive according to claim 14, wherein said shaft is a stationary component of said spindle motor.

* * * * *